United States Patent [19]

duPont

[11] 4,010,249

[45] Mar. 1, 1977

[54] PROCESS FOR THE PREPARATION OF HYDROGEN

[76] Inventor: Anthony A. duPont, 8 Georgeff Road, Rolling Hills, Calif. 90274

[22] Filed: Sept. 15, 1975

[21] Appl. No.: 613,236

[52] U.S. Cl. .............................. 423/657; 423/417; 423/472; 423/475; 423/413; 423/579; 423/592

[51] Int. Cl.² ..................... C01B 1/08; C01G 53/02; C01G 53/04; C01G 53/00

[58] Field of Search .......... 423/657, 472, 592, 417, 423/475, 493, 579

[56] References Cited

UNITED STATES PATENTS

| | | | |
|---|---|---|---|
| 2,590,078 | 3/1952 | Maeder | 423/417 |
| 3,017,250 | 1/1962 | Watkins | 423/657 |
| 3,720,603 | 3/1973 | Gleim | 423/417 X |
| 3,839,550 | 10/1974 | Wentorf, Jr. | 423/657 X |

*Primary Examiner*—Edward Stern

[57] ABSTRACT

Hydrogen is produced from water by the addition of heat to a series of chemical reactions which comprise the reaction of cadmium with water, and the subsequent recovery of the cadmium for re-use. The equipment used to produce the hydrogen requires only the input of water and heat to produce an output of hydrogen and oxygen gas.

5 Claims, No Drawings

PROCESS FOR THE PREPARATION OF HYDROGEN

BACKGROUND OF THE INVENTION

Processes are known for the production of hydrogen by means of a series of chemical reactions. For example, hydrogen has been prepared in a chemical system which includes the reaction of mercury with hydrogen bromide, with the resulting formation of mercury bromide and hydrogen. Hydrogen has also been prepared by the hydrolysis of boron hydrides, such as sodium borohydride. Other processes have also been described in the prior art literature. However, the prior art processes for the most part are subject to one or more disadvantages or difficulties, such as corrosiveness, instability or toxicity of the materials involved, high temperature or difficult separations required in carrying out the prior art processes, all of which militate against their commercial feasibility.

The process of the invention in its preferred embodiment uses cadmium in reaction with steam to produce hydrogen. This preferred embodiment actually uses gallium triiodide, ($GaI_3$), which disassociates at elevated temperatures to absorb a large fraction of the heat required to split the water into hydrogen and oxygen. Iodine is used to form cadmium iodide and cadmium iodate at relatively low temperatures, in order to recover the cadmium for re-use. Decomposition of the cadmium iodate is achieved at elevated temperatures, for example, by use of heat from nuclear fission. An advantage of this embodiment is the non-corrosiveness and the ready separation of the cadmium during the recovery process.

Another embodiment of the process uses nickel to produce hydrogen. This embodiment also has the advantage in that nickel is non-corrosive, and it combines with steam under pressure at relatively low temperature to produce hydrogen and nickel hydroxide, $Ni(OH)_2$, with minimum heat requirements. The nickel is subsequently recovered for re-use by heating the hydroxide to form the oxide NiO, and the reaction of nickel oxide with iodine to form nickel iodide, $NiI_2$ and nickel iodate $Ni(IO_3)_2$, which are also produced at relatively low temperatures, although pressure is required. The nickel iodate is then decomposed at elevated temperatures to release the oxygen and recover nickel oxide and iodine for re-use. The nickel iodide is either decomposed directly with heat or reacted with carbon monoxide under pressure to form nickel carbonyl, $Ni(CO)_4$, which is decomposed at relatively low temperatures by adding heat.

Thus, the invention provides an improved, low cost process for producing hydrogen from water by the addition of heat to a series of chemical reactions. The equipment to produce the hydrogen by the process of the invention requires only the input of water and heat to produce an output of hydrogen gas. The substances used in the reaction are recycled so that no additional substances are required. The operation of the equipment is analogous to that of an electrolytic cell, except that heat is applied instead of electricity. By using heat directly in the practice of the process of the present invention, instead of going through an intermediate step of converting the heat into electricity, hydrogen can be produced with less energy than is required by electrolysis.

The process of the present invention fulfills the criteria of providing a phase change at each step to aid separation; of using relatively non-corrosive substances to prevent contamination from the equipment; and of using reactions that absorb heat at relatively low temperature.

The use of cadmium or nickel in the embodiments of the process to be described is advantageous because the equipment can be made to present a surface of the same metal, and in this way, any reaction with the equipment surface will not contaminate the process.

DETAILED DESCRIPTION OF ONE EMBODIMENT OF THE PROCESS

The following chemical reactions are involved:

$$Ni + 2H_2O \rightarrow Ni(OH)_2 + H_2$$
$$Ni(OH)_2 \rightarrow NiO + H_2O$$
$$6NiO + 6I_2 \rightarrow Ni(IO_3)_2 + 5NiI_2$$
$$Ni(IO_3)_2 \rightarrow NiO + I_2 + 5/2\ O_2$$
$$NiI_2 + 4CO \rightarrow Ni(CO)_4 + I_2$$
$$Ni(CO)_4 \rightarrow Ni + 4CO$$

The endothermic reactions which absorb heat are the decomposition of the iodate, $Ni(IO_3)_2$, and the decomposition of the nickel carbonyl, $Ni(CO)_4$. All the other reactions are exothermic and release heat. The algebraic sum of the net heat absorbed by the endothermic reactions and the heat released by the exothermic reactions is equal to the heat of formation of water, that is, the heat released by burning hydrogen. A large part of the heat is absorbed by the carbonyl decomposition which can take place at 60° C at 1 atmosphere. The decomposition of the iodate, $(Ni(IO_3)_2$, is the highest temperature reaction, this sets the temperature required for the process. The thermodynamic calculations indicate that this reaction should proceed at from 200° – 400° C.

Nickel carbonyl $Ni(CO)_4$ can be formed from the iodide at 200° C at 200 atmospheres. The finely divided nickel powder produced by the decomposition of the carbonyl reacts with steam at moderate temperatures to make the hydroxide under pressure. Formation of the iodide, $NiI_2$, and iodate $Ni(IO_3)_2$, can take place in an aqueous solution. Therefore, this process can use conventional heat sources, such as a nuclear reactor, or even the heat in a gas turbine exhaust, or the heat obtained from burning fuel. Moreover, the process is within the range of temperatures attainable from solar concentrators. Heat losses from the system occur primarily in the evaporation step which separates the iodide from the aqueous solution, condensing the steam to separate it from the hydrogen, and the distillation of the incoming water which must be distilled several times to achieve high purity. A small amount of heat is carried out by the hydrogen and oxygen streams. Use of the invention with the electrode of a hydrogen fuel cell eliminates the losses in condensing the steam and purifying the water since the hydrogen is used chemically by the electrode which rejects the steam and the fuel cell produces electrolytically pure water.

Nickel oxide or hydroxide is insoluble and removed from the first hydrogen producing reaction by a water slurry. Hydrogen is removed from the excess steam by condensing the steam. Nickel iodate is only very slightly soluble and will precipitate out of the second reaction. Water is removed from the nickel iodide solution by evaporation. Heating the nickel iodide to remove the last traces of water will also decompose the trace of iodate which was in solution. The reduction of nickel iodide to nickel metal may be accomplished in one reactor by heating the nickel iodide in the presence of carbon monoxide to form the nickel carbonyl which immediately decomposes if its temperature is raised.

Nickel is a magnetic substance and magnetic means may be used to separate the resulting finely divided nickel powder from the iodine and carbon monoxide present after the last reaction. The iodine is removed by condensing it to a liquid and added to the second, aqueous solution step.

Since the last step of the process, that is the reduction of the iodide, can be carried out at a low temperature, this step may be used as the heat sink for the water condensing required to separate out the iodide and purify the incoming water. When such a technique is used, the process approaches 100% efficiency since no cooling water is required, and the only loss is the heat carried off by the hydrogen and oxygen and the heat lost to the surroundings through the walls of the equipment.

In the implementation of the process, the walls and other portions of the equipment which come in contact with the chemicals can be made of nickel, so that any reaction of the chemicals with the wall surfaces will not contaminate the process since nickel is present in every step. Oxygen compounds such as water or nickel oxide, or nickel iodate carried into the last step can be reduced by carbon monoxide thereby forming carbon dioxide. Also, carbon monoxide carried into steps containing the oxygen bearing material or pure oxygen will be oxidized to carbon dioxide. The carbon dioxide is removed in a scrubber and periodically the used up carbon monoxide is replaced. Traces of other materials entering the system with the water is another source of contamination of the chemicals in the system, and the chemicals may have to be replaced or purified after relatively long intervals of operation.

The purpose of adding carbon monoxide to the last step of the process is to lower the decomposition temperature of nickel iodide and to obtain very finely divided nickel for the first hydrogen producing step. As an alternative, the nickel iodide could be decomposed at about 700° C at 1 atmosphere, and the resulting nickel sponge could be broken up mechanically for use in the first step of the process.

DETAILED DESCRIPTION OF A PRESENTLY PREFERRED EMBODIMENT OF THE PROCESS

The following chemical reactions are involved:

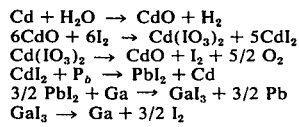

Advantages of this invention are the ready separation of the products and the ability to transport the reactants as liquids. For example, the replacement of cadmium by lead in cadmium iodide, $CdI_2$, results in gaseous cadmium which can be taken off the top of a column of liquid lead and lead iodide, $PbI_2$, while gaseous cadmium iodide is fed into the bottom of the column. The liquid cadmium condensed from the vapor drawn off the top of the column is sprayed into steam and reacts with the steam to form the oxide, CdO, and hydrogen gas. The hydrogen gas is easily separated from the mixture of steam and hydrogen present after the first reaction by condensing the steam. Iodine may be added as a liquid to the cadmium oxide powder to form the iodide and the iodate, $Cd(IO_3)_2$, in an ether solution. Iodine and cadmium iodide are soluble in ether, but the iodate is not and precipitates out. The iodate is decomposed by heating into cadmium oxide, iodine and oxygen gas. The iodine is removed from the oxygen by condensing it. The liquid iodine and cadmium oxide powder are returned to the previous reaction. Cadmium iodide can be moved to the next reaction as a liquid by heating it above 388° C. It is heated further and added to the reaction as a gas above 713° C. The heat to boil the cadmium iodide may be obtained by cooling and condensing the cadmium obtained from the reaction and by cooling the lead iodide obtained. Cadmium condenses at 767° C. Gallium is a liquid at temperatures slightly above room temperature and is added to lead iodide as a liquid. Lead iodide melts at 402° C. Gallium triiodide, $GaI_3$, formed by the second replacement reaction is a vapor at 346° C and leaves the reaction in the gaseous state. Lead melts at 328° C and can be removed from the reaction as a liquid and transferred to the previous replacement reaction. Decomposition of the triiodide into gallium and iodine produces liquid gallium and gaseous iodine. The iodine gas can be condensed and transferred to the reaction that forms the iodide and the iodate, and the gallium transferred to the second replacement reaction.

The unique properties of gallium make this process possible. The wide temperature range in which gallium is in the liquid state makes it easier to move the gallium between reactions.

The maximum temperature at which heat must be applied is 600° to 800° C set by the decomposition temperature of gallium triiodide. The maximum reaction temperature set by the first replacement reaction at above 767° C is self generating by an exothermic reaction. Therefore, the process can use heat from a nuclear reactor as well as concentrated solar energy to provide fuel from a non-fossil energy base.

The invention provides, therefore, an improved and relatively and inexpensive process which is feasible for the commercial production of hydrogen at relatively low cost.

Although particular embodiments of the invention have been described, modifications may be made. It is intended in the claims to cover the modifications which come within the spirit and scope of the invention.

What is claimed is:
1. A process for generating hydrogen which comprises: (a) reacting nickel metal with water to form nickel hydroxide and hydrogen; (b) decomposing the hydroxide to the oxide and water with the addition of heat; (c) reacting iodine with the nickel oxide to form nickel iodide and nickel iodate; (d) decomposing the nickel iodate by the introduction of heat to form nickel oxide; (e) decomposing the nickel iodide by the introduction of heat to recover the original nickel; and (f) recycling the recovered nickel into step (a) of the process.

2. The process defined in claim 1, and which includes the step of introducing carbon monoxide during step (e) to form nickel carbonyl, and which includes the step of decomposing the nickel carbonyl by the introduction of heat to form finely divided nickel.

3. The process defined in claim 1, and which comprises: (a) reacting nickel metal with steam to form nickel hydroxide and hydrogen; (b) decomposing the hydroxide to the oxide and water with heat; (c) reacting iodine with the nickel oxide to form nickel iodide and nickel iodate; (d) decomposing the nickel iodate by the introduction of heat to form nickel oxide, oxygen and iodine; reacting the last-named nickel oxide with the last-named iodine to form nickel iodide and nickel iodate; (e) decomposing the nickel iodide by the introduction of heat to recover the original nickel metal; and (f) recycling the recovered nickel into step (a) of the process.

4. The process defined in claim 1, and which comprises: (a) reacting nickel metal with steam to form nickel hydroxide and hydrogen; (b) decomposing the hydroxide to the oxide and water with heat; (c) reacting iodine with the nickel oxide to form nickel iodide and nickel iodate; (d) decomposing the nickel iodate by the introduction of heat to form nickel oxide oxygen and iodine; reacting the last-named nickel oxide with the last-named iodine to form nickel iodide and nickel iodate; (e) forming nickel carbonyl from the iodide by adding the iodide to carbon monoxide under pressure; (f) decomposing the nickel carbonyl with the addition of heat to recover the original nickel metal; and (g) recycling the recovered nickel metal into step (a) of the process.

5. The process defined in claim 1, and which includes the step of forming the walls of the equipment coming in contact with the reactants and reaction by-products of the process of nickel to prevent contamination therewith.

* * * * *